United States Patent
Andersen et al.

(10) Patent No.: US 12,438,435 B2
(45) Date of Patent: Oct. 7, 2025

(54) METHOD FOR REDUCTION OF DC LINK BUSBAR AND CAPACITOR CURRENT, BY ADJUSTMENT OF A PWM CARRIER DELAY

(71) Applicant: VESTAS WIND SYSTEMS A/S, Aarhus N (DK)

(72) Inventors: Thomas Lundgren Andersen, Hinnerup (DK); Morten Lindholm, Højbjerg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 277 days.

(21) Appl. No.: 18/247,732

(22) PCT Filed: Sep. 30, 2021

(86) PCT No.: PCT/DK2021/050303
§ 371 (c)(1),
(2) Date: Apr. 3, 2023

(87) PCT Pub. No.: WO2022/069012
PCT Pub. Date: Apr. 7, 2022

(65) Prior Publication Data
US 2023/0421041 A1   Dec. 28, 2023

(30) Foreign Application Priority Data

Oct. 1, 2020   (DK) .................................. 2020 70667

(51) Int. Cl.
*H02M 1/00*      (2007.01)
*F03D 13/20*     (2016.01)
(Continued)

(52) U.S. Cl.
CPC ........ *H02M 1/0048* (2021.05); *F03D 13/201* (2023.08); *H02M 1/0009* (2021.05);
(Continued)

(58) Field of Classification Search
CPC ............ H02M 1/0048; H02M 1/0009; H02M 1/0043; H02M 1/12; H02M 5/453;
(Continued)

(56) References Cited

U.S. PATENT DOCUMENTS

2005/0225270 A1* 10/2005 Schnetzka ........... H02M 5/4585
318/66
2012/0133211 A1* 5/2012 Jones ........................ H02J 3/40
307/82

(Continued)

FOREIGN PATENT DOCUMENTS

CN        104052306 A  *  9/2014 .............. H02M 1/32
CN        107017762 B     10/2019
(Continued)

OTHER PUBLICATIONS

"Study of interleaved PWM strategies applied to two back-to-back three-phase full bridges", Mathematics and Computers in Simulation, Elsevier, Amsterdam, NL, vol. 184, Feb. 25, 2020 (Feb. 25, 2020), pp. 55-68, (Year: 2020).*

(Continued)

*Primary Examiner* — Thienvu V Tran
*Assistant Examiner* — Yahveh Comas Torres
(74) *Attorney, Agent, or Firm* — Patterson + Sheridan, LLP; Gero G. McClellan (57) ABSTRACT

The present invention relates a method for optimizing electrical current in a DC link busbar of a power converter system, wherein the power converter system comprises, a first inverter bridge, connected to the DC link busbar at a first end, the first inverter bridge having a first pulse width modulation signal, and a second inverter bridge, connected to the DC link busbar at a second end, the second inverter bridge having a second pulse width modulation signal, measuring a current flowing in the DC link busbar from the (Continued)

first end to the second end, optimizing the current flowing in the DC link busbar by delaying the first pulse width modulation signal and the second pulse width modulation signal from each other with a carrier delay, the invention also relates to power converter and wind turbine with optimizing electrical current in a DC link busbar.

12 Claims, 7 Drawing Sheets

(51) Int. Cl.
    *H02M 1/12*    (2006.01)
    *H02M 5/458*    (2006.01)

(52) U.S. Cl.
    CPC ........... *H02M 1/0043* (2021.05); *H02M 1/12* (2013.01); *H02M 5/458* (2013.01)

(58) Field of Classification Search
    CPC ........ H02M 5/458; Y02B 70/10; Y02E 10/76; F03D 13/20
    See application file for complete search history.

(56) References Cited

U.S. PATENT DOCUMENTS

| | | | |
|---|---|---|---|
| 2012/0155125 A1 | 6/2012 | Zhang et al. | |
| 2014/0361613 A1 | 12/2014 | Huang et al. | |
| 2019/0006966 A1 | 1/2019 | Valdivia Guerrero et al. | |
| 2019/0312502 A1* | 10/2019 | Ganireddy | ............. H02P 9/007 |
| 2020/0067437 A1* | 2/2020 | Wagoner | ............... F03D 7/0244 |

FOREIGN PATENT DOCUMENTS

| | | | | |
|---|---|---|---|---|
| EP | 1978628 A2 | 10/2008 | | |
| WO | WO-2020169797 A1 * | 8/2020 | ......... | G01R 33/3852 |
| WO | 2022069012 A1 | 4/2022 | | |

OTHER PUBLICATIONS

Shen Lei et al: "Active DC-Link Capacitor Harmonic Current Reduction in Two-Level Back-to-Back Converter", IEEE Transactions on Power Electronics, Institute of Electrical and Electronics Engineers, USA, vol. 31, No. 10, Oct. 1, 2016 (Oct. 1, 2016), pp. 6947-6954 (Year: 2016).*
English Translation CN-104052306-A (Year: 2014).*
Zhang Zhenbin et al: "Nonlinear Direct Control for Three-Level NPC Back-to-Back Converter PMSG Wind Turbine Systems: Experimental Assessment With FPGA", IEEE Transactions On Industrial Informatics, IEEE Service Center, New York, NY, US, vol. 13, No. 3, Jun. 1, 2017 (Jun. 1, 2017), pp. 1172-1183, (Year: 2017).*
European Patent Office, Communication pursuant to Article 94(3) EPC for European Patent Application No. 21795753.0, dated Jul. 5, 2024.
Li et al., "Sensorless control for a three-phase PWM rectifier-inverter system with single-chip micro-controller", Electrical Machines and Systems, 2009. ICEMS 2009. International Conference on, IEEE, Piscataway, NJ, USA, Nov. 15, 2009 (Nov. 15, 2009), pp. 1-6, XP031612114, ISBN: 978-1-4244-5177-7.
Danish Patent and Trademark Office, 1st Technical Examination including The Search Report and Search Opinion for Application PA 2020 70667 dated Mar. 24, 2021.
PCT, International Search Report and Written Opinion of The International Searching Authority for Application PCT/DK2021/050303 dated Dec. 23, 2021.
Patin Nicolas et al., "Study of interleaved PWM strategies applied to two back-to-back three-phase full bridges," Mathematics and Computers in Simulation, vol. 184, Dated: Feb. 25, 2020, pp. 55-68.
Shen Lei et al., "Active DC-Link Capacitor Harmonic Current Reduction in Two-Level Back-to-Back Converter," IEEE Transactions on Power Electronics, vol. 31, No. 10, Dated: Oct. 1, 2016, pp. 6947-6954.
Gonzalez L G et al., "Effects of the PWM carrier signals synchronization on the DC-link current in back-to-back converters," Applied Energy, vol. 87, No. 8, Dated: Aug. 1, 2010, pp. 2491-2499.
Zhang Zhenbin et al., "Nonlinear Direct Control for Three-Level NPC Back-to-Back Converter PMSG Wind Turbine Systems: Experimental Assessment with FPGA," IEEE Transactions on Industrial Informatics, vol. 13, No. 3, Dated: Jun. 1, 2017, pp. 1172-1183.

* cited by examiner

Figure 8, upper

Figure 8, lower

Figure 9

METHOD FOR REDUCTION OF DC LINK BUSBAR AND CAPACITOR CURRENT, BY ADJUSTMENT OF A PWM CARRIER DELAY

FIELD OF THE INVENTION

The invention relates to a method for optimizing electrical current in a DC link busbar of a power converter system, with a first and a second inverter bridge, connected to the DC link busbar.

BACKGROUND OF THE INVENTION

Large power converters, especially AC/DC and DC/AC are becoming an essential component in present day renewable energy production, in such as wind turbine generator and solar PV plant. At the same time, there is a still an important use of power converters in operations of electric motors in a more sustainable manner, as variable speed operation is possible. In order to operate efficiently, these power converters needs to have a low inductive DC link connecting the AC/DC side with the DC/AC side. To make the DC link in a low inductive design, they are most often designed in a laminated plate design in either copper or aluminum.

This means that all the converted power has to go through the DC link, and thus the thermal stress on the DC link is high, as a high current has to pass through the laminated busbar.

It is an object of the present invention to provide a method and system which reduces the current in the DC link and thereby also the thermal stress, while still having the same operational range of the electrical machine connected.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In an aspect, the present invention relates to a method for optimizing electrical current in a DC link busbar of a power converter system, wherein the power converter system comprises,
  a first inverter bridge, connected to the DC link busbar at a first end, the first inverter bridge having a first pulse width modulation signal and
  a second inverter bridge, connected to the DC link busbar at a second end, the second inverter bridge having a second pulse width modulation signal,
  measuring a current flowing in the DC link busbar from the first end to the second end,
  optimizing the current flowing in the DC link busbar by delaying the first pulse width modulation signal and the second pulse width modulation signal from each other with a carrier delay.

An advantage of the first aspect is mainly that current in the DC link busbar is optimized and the converter will thereby be operated in manner, where the losses in the DC link busbar is reduced, thus the temperature in the same, is maintained within a safe range. Further advantages of the above are also a longer DC link busbar lifetime and DC capacitor lifetime, and possible higher converter output.

According to one embodiment of the invention the step of optimizing the current comprises minimizing the measured RMS current in the DC link busbar.

According to one embodiment of the invention the step of optimizing the current further comprises,
  filtering the measured current in a high pass filter, wherein the optimization is based on the high pass filtered current measurement.

An advantage of the embodiment is that is only requires optimizing of the harmonic components.

According to one embodiment of the invention the step of optimizing the current comprises, minimizing the power losses in the DC link busbar by
  deriving a model of the impedance of the DC link bus,
  derive harmonic current components of the current flowing in the DC link busbar,
  calculate power losses in the DC link bus based on the model of the impedance of the DC link bus and the harmonic current components.

An advantage of the embodiment is that it only requires optimization of the harmonic components, and that it is the losses which are optimized as the frequency component of the impedance is taken into account.

According to one embodiment of the invention the step of deriving at least one harmonic current components comprises:
  components around the first harmonics of the switching frequency and
  components around the second harmonics of the switching frequency.

An advantage of the embodiment is that is only requires optimizing of the first and the second harmonic components, so the analytical part to derive the harmonics is reduced, and that it is the losses which are optimized as the frequency component of the impedance is taken into account.

According to one embodiment of the invention the step of deriving at least one harmonic current components comprises:
  components around the second harmonics of the switching frequency.

An advantage of the embodiment is that is only requires optimizing of the second harmonic components and that it is the losses which are optimized as the frequency component of the impedance is taken into account.

According to one embodiment of the invention it further comprises,
  recording periodically data sets with carrier delay as a function of active power, reactive power and measured current,
  operating the converter system with a carrier delay based on look up tables in the data sets.

According to one embodiment of the invention the step of periodically recording data sets occurs with a fixed interval, such as once a day, once a week or once a month, and the carrier delay is updated with the same intervals.

According to one embodiment of the invention step of periodically recording data sets occurs based on predefined events, and the carrier delay is updated as a consequence of the predefined events.

An advantage of these embodiment is that the system adapts to changes in parameters over time.

According to one embodiment of the invention it further comprises,
  a first carrier frequency of the first pulse width modulation signal and
  a second carrier frequency of the first pulse width modulation signal, wherein the first carrier frequency and the second carrier frequency are the same, or an integer multiply of one of the other.

According to one embodiment of the invention it further comprises, a first carrier frequency of the first pulse width modulation signal and a second carrier frequency of the first pulse width modulation signal, wherein the first carrier frequency and the second carrier frequency are different and a non-integer multiply of one of the other.

In a second aspect, the present invention relates to a power converter with optimized current flow in a DC link busbar, wherein the power converter system comprises, a first inverter bridge, connected to the DC link busbar at a first end, the first inverter bridge arranged with a first pulse width modulation signal and a second inverter bridge, connected to the DC link busbar at a second end, the second inverter bridge arranged with a second pulse width modulation signal, a sensor arranged to measure a current flowing in the DC link busbar from the first end to the second end, a controller arranged optimizing/minimizing the current flowing in the DC link busbar by delaying the first pulse width modulation signal and the second pulse width modulation signal from each other with a carrier delay.

In a third aspect, the present invention relates to wind turbine with a power converter according to the first aspect and its embodiments.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DETAILED DESCRIPTION

Figure 1:
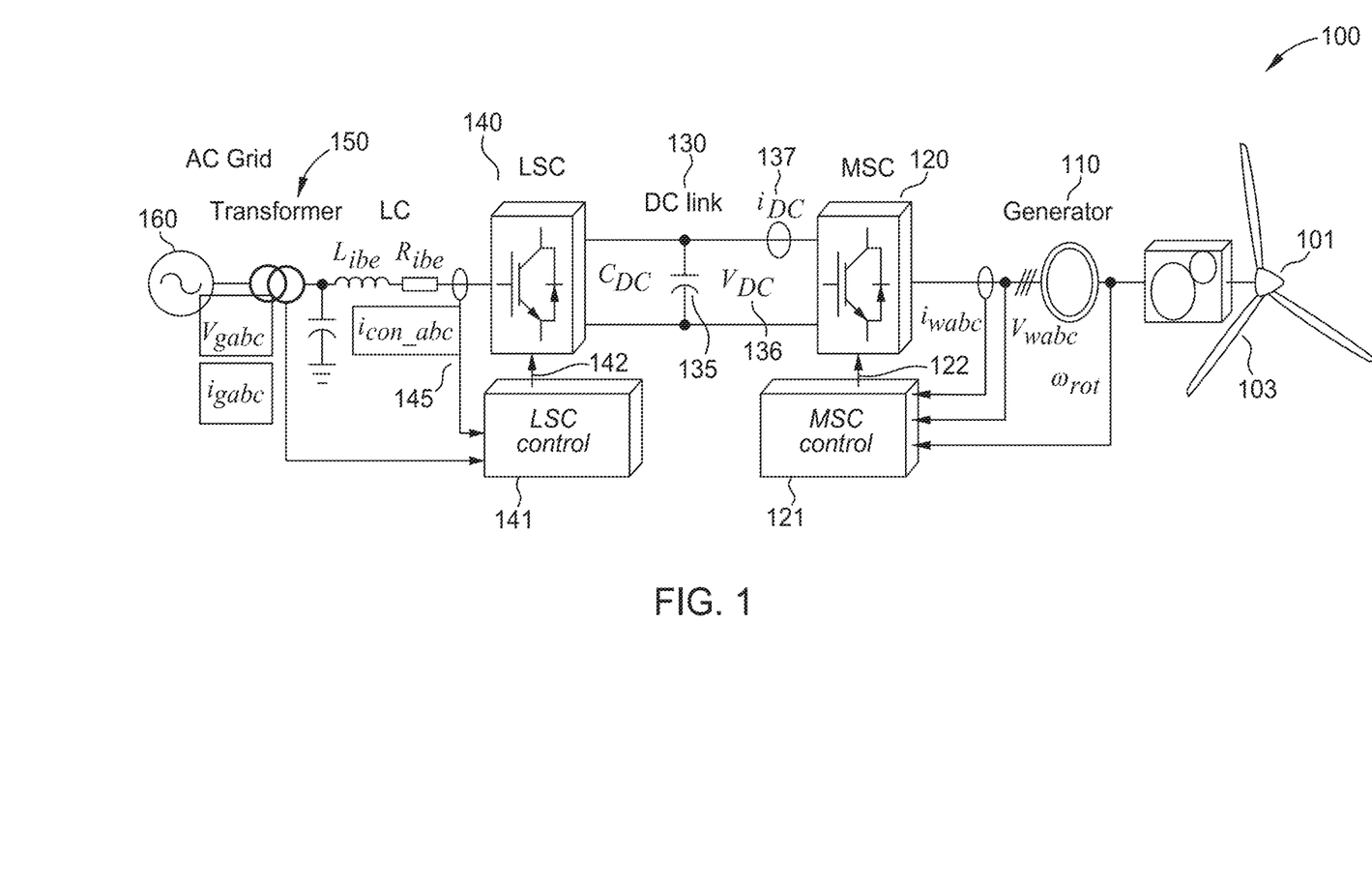
FIG. 1, shows an example of back to back power converter in a wind turbine application.

FIG. 1 shows a wind turbine 100 (WTG) comprising a rotor 101 with at least one rotor blade 103, such as three blades. The rotor 101 is rotatable by action of the wind. The wind induced rotational energy of the rotor blades 103 is transferred via a shaft to the generator 110. Thus, the wind turbine 100 is capable of converting kinetic energy of the wind into mechanical energy by means of the rotor blades and, subsequently, into electric power by means of the generator 110. The generator is connected with a power converter which comprises a generator side converter MSC 120 and a line side converter LSC 140. The generator side converter MSC converts the generator AC power into DC power, the DC power is transferred to the line side converter LSC via a DC link 130, where the DC link comprises at least one capacitor 135. The line side converter LSC converts the DC power into an AC power for injection into the utility grid 160. The line side converter is often connected to the grid via a step up transformer 150, with is not required. The generator side converter 120 is controlled by MSC controller 121 which receives control inputs, such as, but not limited to, generator voltages and currents and rotational speed of the generator 110. The MSC controller sends control inputs to the generator side converter such as PWM signals 122. Similarly is the line side converter 140 controlled by a LSC controller 141, which also receives voltage and current signals 145 of the outputs of the line side converter, and the DC link voltage level 136 and the current flow 137 in the DC link busbar 130. The LSC controller sends control inputs to the line side converter LSC such as PWM signals 142.

The PWM signals of both the LSC and MSC controller are based on a PWM carrier signals, and is operated with switching frequency (fsw) in the kHz range, often a few kHz.

A given converter with a given physical DC link construction will contain a certain set of inductances and capacitances in the DC link construction. An example of such is shown in FIG. 2.

Often both the LSC and MSC converter comprises one or more stacks. Where a stack means a converter bridge with the capability of converting a portion of the required power, such that a 5 MW converter could comprise 4 LSC converter stack and 4 MSC converter stack, where each stack converts 1.25 MW of 3 phase AC to DC power or reverse. Each stack is connected to the DC link busbar.

The DC link busbar of a power converter system is known to the skilled person, as low inductance system with a positive and negative conductor assembled in a laminar manner. The physical dimension of the DC link busbar differs from the design to design, but a power converter in the range of 2-4 MW, is often assembled in a cubicle arrangement with a length of 3-8 meters, meaning that the DC link busbar often extent through out all the cubicles or at least the majority of the cubicle elements.

Figure 2:
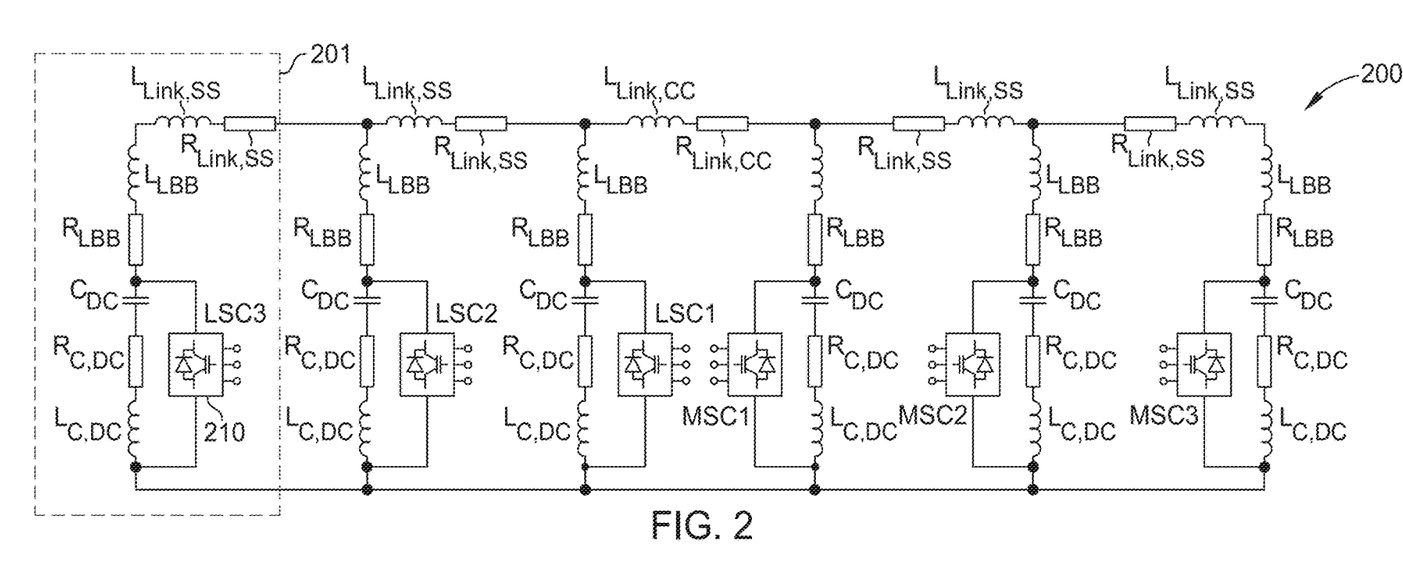
FIG. 2, shows an example of a DC-Link model, with three LSC and three MSC modules each.

FIG. 2 shows an electrical model 200 of an arrangement where 3 MSC stacks 201 are aligned next to each and followed by 3 LSC stacks.

Each converter stack branch comprises a switch element 210, also labelled LSC1-3 and MSC1-3. In parallel with the swith element 210 is a series connection of an inductance L_c,DC, resistance R_c,DC and capacitance C_DC. The connection to DC link busbar results in additional "parasitic" components, an inductance L_LBB and a resistance R_LBB. The connection from one converter stack branch to the next converter stack branch leads to further components, an inductance L_Link,SS and a resistance R_Link,SS. Further converter stack branches can be modelled by expanding the model.

The part of the DC link busbar which is between a line side converter LSC stack branch and generator side converter MSC stack branch, is denoted by the component inductance L_Link, CC and resistance R_Link,CC.

This means that a given converter will have a specific optimum of one or more PWM carrier delay values, as the optimum is given by the set of impedances in combination with the PWM signals. By using the an optimal PWM carrier delay, the DC link RMS current can be lowered compared to no PWM carrier adjustments.

Figure 3:
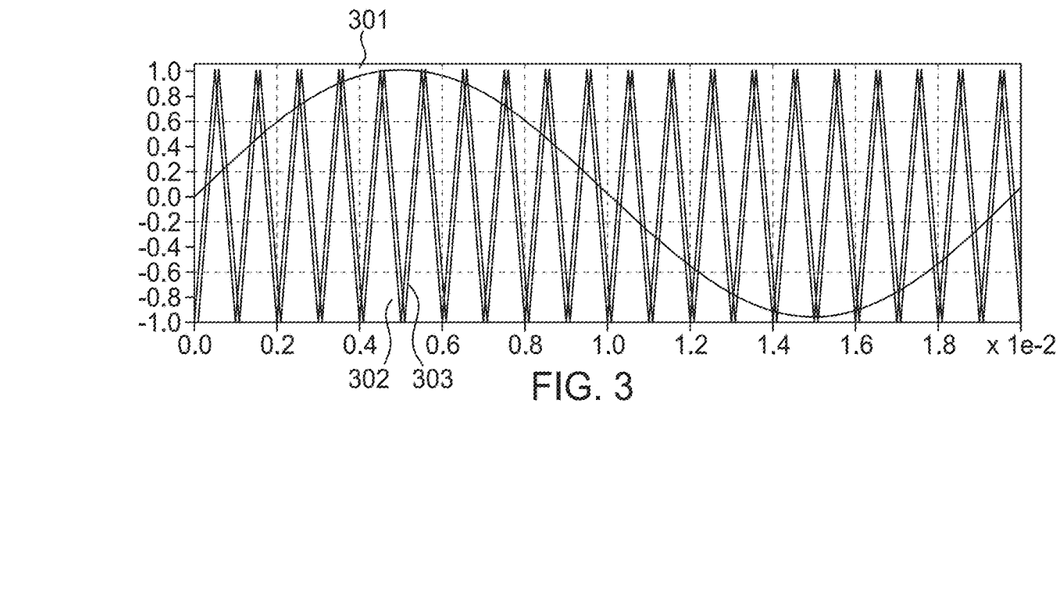
FIG. 3, shows PWM modulation by carrier comparison, showing two carriers.

In FIG. 3, the PWM modulation carriers are shown as the triangular wave. The is a sinusoidal curve 301 which is the signal to be modulated. This is done by comparing it to one of the carrier signals 302, 303. PWM modulation is known to the skilled person, and will not be explained further.

This triangular carrier can be the same for all stacks in the LSC or MSC converter, or the individual stacks of the converter can have its own carrier.

In an embodiment of the invention, the individual stacks in the LSC or MSC converter are operated with interleaved switching, so there is a carrier delay between each stacks. This means the optimization for minimizing the losses in the DC link becomes complex, but still possible.

Figure 4:
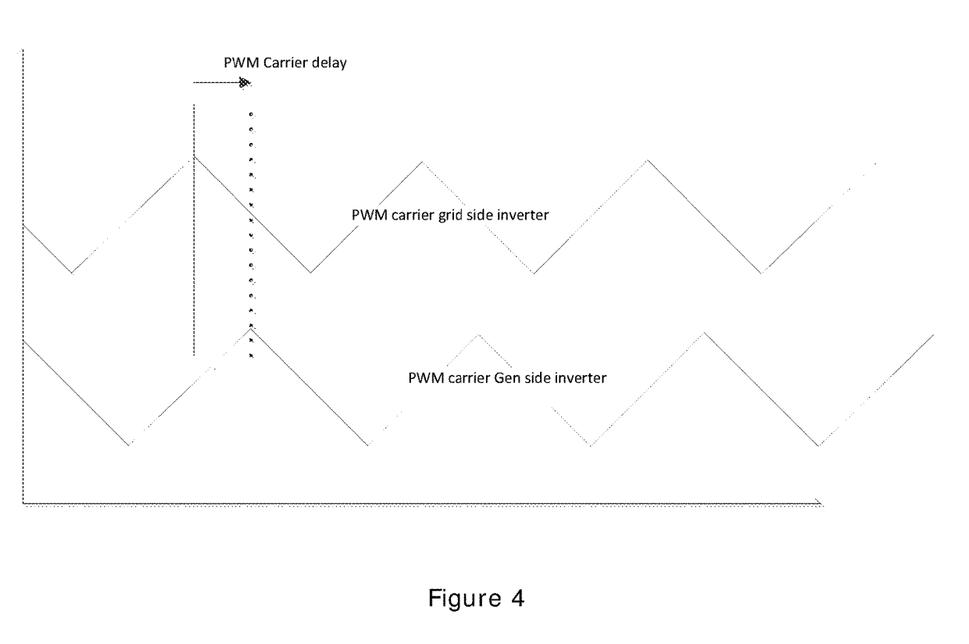
FIG. 4, shows enlarged view of two carriers with a carrier delay.

Furthermore FIG. 3 shows an example of delayed carrier, grid side compared to generator side. FIG. 4 shows in more details what is meant by carrier delay.

With a zero degrees delays the LSC and MSC PWM carrier signals are aligned and in phase with each other. Whereas in FIG. 4 there is delay between the two carrier signals shown by the arrow, from the solid line to the dotted line.

Going back to FIG. 1. Measurements of the DC link currents 137 in the DC side of the converter stacks are performed in order to analyze the losses in the DC link and analyze the frequency content of the current. Voltage measurements 136 can also be used in the optimization.

A current probe is mounted to measure the differential mode DC link ripple current for each stack. The DC current cannot easily be measured, because it is not "just" to insert a current sensor or current probe with a hall element inside the DC link construction, due to the large physical dimension of the laminated DC bus.

In an embodiment a rogowski probe can be inserted around the DC link where the converter stack DC terminals connect to the DC link busbar. In order to measure the higher harmonic components in the current it is of course needed, that the current probe has a bandwidth which covers the frequency range of interest.

In an embodiment it is also possible to measure the DC output current from each stack.

Figure 5:
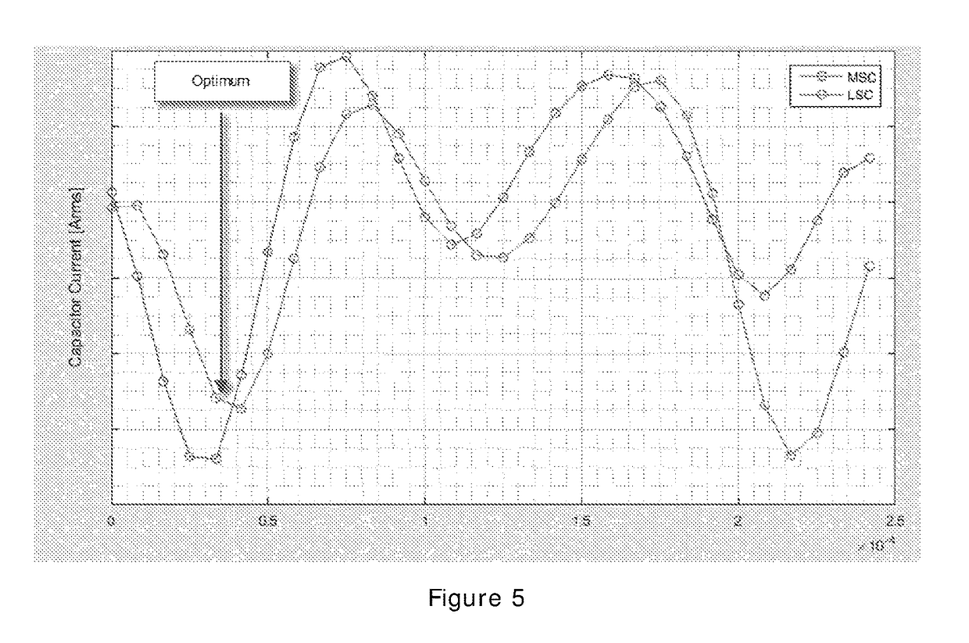
FIG. 5, shows simulation of DC link current in converter with one gridside inverter and one generator side inverter as a function of carrier delay.

FIG. 5 shows a simulation of DC link current in converter with one gridside inverter and one generator side inverter as a function of carrier delay. The results of this carrier delay sweap, shows especially around 0.2 and 0.3 times (1/fsw) the RMS current drops to an interesting level of around 80% compared to if no PWM carrier delay is used.

Figure 6:
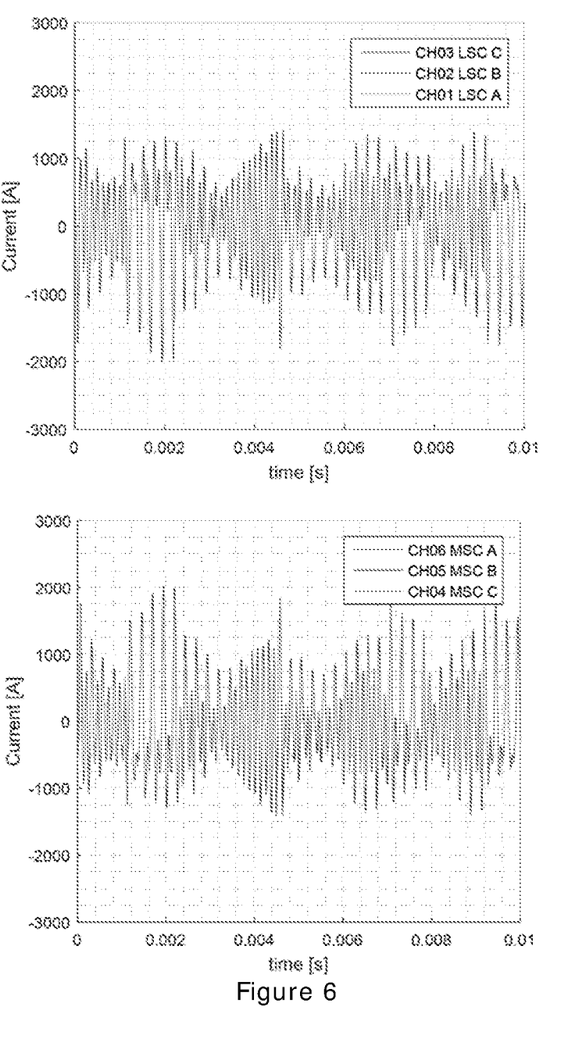
FIG. 6, shows DC link stack currents.

FIG. 6 shows DC side current measurements of the three converter stack branches (upper Figure: Line side, lower Figure: machine side) without a carrier delay, where the legend mentions traces from the LSC A, LSC B and LSC C, i.e. stack A, B & C. and similar for generator side MSC. The stack arrangement used, is with 3 MSC stacks aligned next to each and followed by 3 LSC stacks, similar to the electrical model of FIG. 2.

The RMS value of each measured current is calculated. Results give that the outer stack has the highest RMS current, as expected and also seen in simulation, which is due to the fact that the outer stacks see the highest inductance in the DC link busbar.

Figure 7:
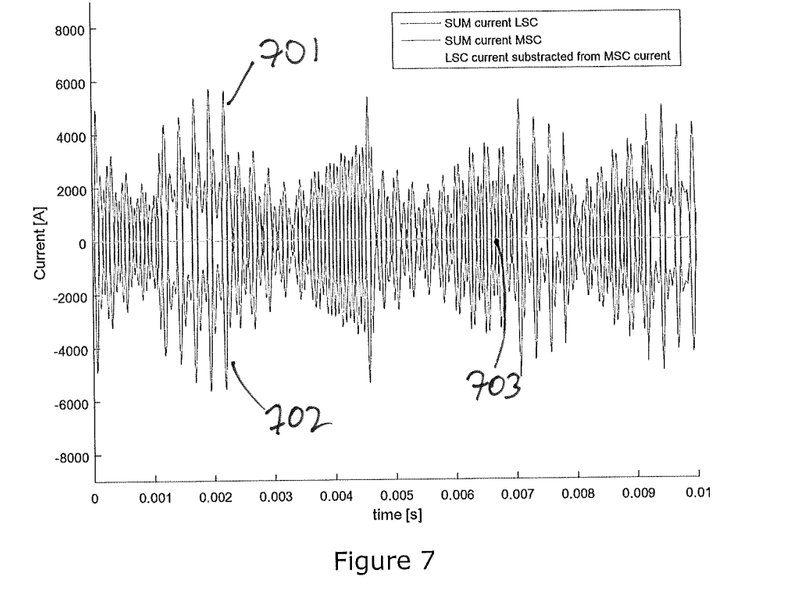
FIG. 7, shows sum of LSC currents and MSC current, and the LSC subtracted from MSC.

FIG. 7 shows measurements of the sum of all LSC DC side currents 701 and the sum of all MSC DC side currents 702. The sum of the LSC currents and the sum of the MSC currents are subtracted from each other 703 to make a check if this gives a zero or close to zero, which seems to be the case.

The PWM carrier on the MSC side of the converter can be moved in time compared to the LSC side, to see if the DC link current can be changed or lowered. The MSC side carrier is for example delayed from 10 to 100% of a switching time fundamental (1/fsw). To achieve the optimal current in the DC link busbar.

The optimization of the current can be made simply by optimizing the RMS current. This can be done by calculating the RMS current of each converter stack for both the LSC and the MSC stack, and then find the average RMS current. The average RMS currents are the derived for a set of carrier delay values, and can then be optimized. This was done for the same system as simulated in FIG. 5, and the simulated and measure optimum seemed both to converge around 0.2 to 0.3 times 1/fsw.

In a more complex manner the frequency components in the current measurements are included. Persons familiar with FFT analysis of PWM operated converters, knows that the FFT components are centered around side bands of the switch frequency (fsw) and 2*fsw.

In each test point an FFT was calculated in Matlab to see what kind of frequencies that are changing during a change in the carrier delay. All the plots of the FFT analysis are analysed.

Figure 8:
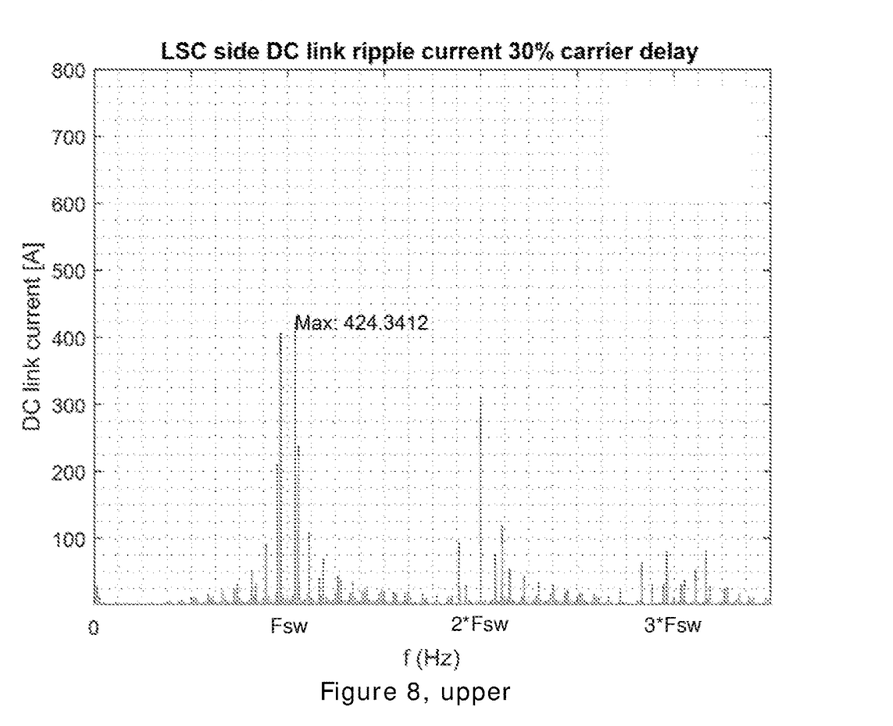
FIG. 8, shows FFT spectrum of DC link stack currents.

FIG. 8 upper part shows an FFT plot of the LSC converter DC link current with a 0.3 carrier delay, currents are shown for all three stacks, the plots are very similar from one stack to the other, and it therefore makes no sense to show three individual figures. FIG. 8 lower part shows the similar FFT plot of the MSC converter DC link current.

It was noted that the 2*fsw component drops significantly around 0.3 delay.

The results show that the fsw and 3*fsw components only changes very little during the carrier delay sweep, however the 2*fsw components are significantly changing and lowered around 0.2 and lowest at 0.3 which is also the point where the total RMS current is lowest.

The conductors of the DC link busbar have, as all other conductors, a frequency dependent impedance. Thus to further improve the capacity of the DC link busbar it is important to minimize the losses in the busbar, as it is the losses which courses the temperature increase. Taking the frequency dependent impedance into account when looking at the current spectrum of the DC link current, means that it may pay to have higher first harmonic current than a higher second harmonic current, as the impedance is higher around the second harmonic. This may explain some of the discrepancies between the calculated losses and measured losses.

Based on the frequency analysis, the losses in the DC link can be calculated for each frequency. Results shows that the resistance increases with the frequency and that the inductance decrease with the frequency. The values are also influenced by the operating temperature of the DC link busbar, in the sense that the resistance increases with the temperature.

When the impedance and current are known for each frequency component, the total losses in the DC link busbar coming from the ripple current can be calculated.

It is also possible to break the DC link busbar in to lengthwise elements in respect of FIG. 2. The calculated losses based on the measured currents are much higher than the simulated losses. Nevertheless to measured and calculated results shows a minimum in the losses around a carrier delay of 30% of the switching frequency fundamental, compared with the losses in the nominal setpoint.

Higher losses in the DC link busbar means rise in temperature of the metal conductor, so any decrease in the losses means an avoided temperature increase, with a potential to conduct a higher load.

Results from a real implementation in a converter system of a multimegawatt system, shows that the losses in the DC link in can be reduced 65% and the DC link busbar temperature can be lowered from 67° C. to 55° C.

In conclusion, the current can be lowered by changing the PWM carrier position for the MSC side, compared to the LSC side, even with a simple current optimization.

The frequency spectrum of the DC link current, often only have a few groups of harmonics, centered around the switching frequency, the first harmonic and the second harmonic of the switching frequency. It is therefore not needed to perform a full FFT (Fast Fourier Transformation) of the current, simple bandpass filtering of the current around both the first and the second harmonic is sufficient to optimize the losses in the busbar, as an estimate of the impedance at the specific harmonics can be used.

It is therefore possible to make an improved optimization where the optimization is based components around the first harmonics of the switching frequency and components around the second harmonics of the switching frequency. Optionally the DC component may also be used.

In a further embodiment the optimization is only performed based on the components around the second harmonics of the switching frequency.

In a measurement sequence the converter controller can sweep the PWM carrier delay from 0 to 100% of the switching frequency fundamental (1/fsw) with any number of internals n_interval each with a time length of t_step. n_interval can be any number, for example 10 or higher. If n_interval is equal to 10 this means that the DC link current is measured at a carrier delay of 10, 20, 30, 40, 50, 60, 70, 80, 90 and 100% delay of the MSC carrier compared to LSC carrier.

In an embodiment, the delay is measured in counts, where the controller can decide to run the converter in the optimal point.

In an embodiment the carrier delay step are divided into a high number of steps, such as 100 or 1000 or higher.

Based on the results a look up table can be generated with data, the controller will choose the optimal carrier delay and use that parameter. The carrier delay can be preset based on a preset load index, both active or reactive power based, in a more advanced and preferred embodiment the optimization of the carrier delay runs routinely in the background, and thereby taking present load and status of the converter system into account, such as temperature and degradation of the DC link capacitors.

The following parameters will change the optimal operating point: Ugrid, Pgrid, Qgrid, Udc, Ugen, fgen, modulation index and modulation strategy.

It can therefore be beneficial to add extra dimensions to the optimization, which takes into account one or more variables from the list: Ugrid, Pgrid, Qgrid, Udc, Ugen, fgen, modulation index and modulation strategy.

In an embodiment the controller periodically records data sets carrier delay as a function of active power, reactive power and measured current, with a fixed interval, such as once a day, once a week or once a month, and the carrier delay is updated with the same intervals.

High load conditions may also alter the physical properties of specific components in the power converter and thus make it relevant to adjust the data sets for which the optimal carrier delay is chosen.

In an embodiment in the controller periodically records data sets based on predefined events, and the carrier delay is updated as a consequence of the predefined events.

In an embodiment only two different carriers are used, one for the line side (LSC) and one for the generator side (MSC).

In an embodiment each converter stack/section has its own carrier, and the optimization becomes more complex.

In an embodiment the switching frequency of the both the machine side inverter and the grid side inverter may not be the same.

Figure 9:
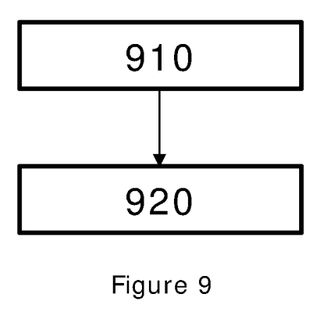
FIG. 9, shows a flowchart according the method claimed.

FIG. 9 shows a flow chart of the method for optimizing electrical current in a DC link busbar of a power converter system, wherein the power converter system comprises, a first inverter bridge, connected to the DC link busbar at a first end, the first inverter bridge having a first pulse width modulation signal, and a second inverter bridge, connected to the DC link busbar at a second end, the second inverter bridge having a second pulse width modulation signal, where step 910 is measuring a current flowing in the DC link busbar from the first end to the second end, step 920 is optimizing the current flowing in the DC link busbar by delaying the first pulse width modulation signal and the second pulse width modulation signal from each other with a carrier delay.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method for optimizing electrical current in a DC link busbar of a power converter system comprising:
    a first inverter bridge, connected to the DC link busbar at a first end, the first inverter bridge having a first pulse width modulation signal, and
    a second inverter bridge, connected to the DC link busbar at a second end, the second inverter bridge having a second pulse width modulation signal; and wherein the method comprises:
    measuring a current flowing in the DC link busbar from the first end to the second end,
    optimizing the current flowing in the DC link busbar by delaying the first pulse width modulation signal and the second pulse width modulation signal from each other with a carrier delay; wherein optimizing the current comprises:
        minimizing power losses in the DC link busbar by deriving a model of a frequency dependent impedance of one or more conductors of the DC link busbar;
        deriving at least one harmonic of the current flowing in the one or more conductors of the DC link busbar; and
        calculating power losses in the DC link busbar based on the at least one harmonic and the model of the frequency dependent impedance of the one or more conductors of the DC link busbar.

2. The method of claim 1, wherein optimizing the current comprises minimizing a measured RMS current in the DC link busbar.

3. The method of claim 1, wherein optimizing the current further comprises,
filtering the current in a high pass filter to generate a filtered current, wherein the optimization is based on the filtered current.

4. The method of claim 1, wherein deriving at least one harmonic comprises:
components around a first harmonic of a switching frequency and
components around a second harmonic of the switching frequency.

5. The method of claim 1 further comprises,
periodically recording data sets with carrier delay as a function of active power, reactive power and measured current,
operating the power converter system with a carrier delay based on look up tables in the data sets.

6. The method of claim 5 further comprises, wherein periodically recording data sets occurs with a fixed interval, such as once a day, once a week or once a month, and the carrier delay is updated with the same intervals.

7. The method of claim 5 further comprises, wherein periodically recording data sets occurs based on predefined events, and the carrier delay is updated as a consequence of the predefined events.

8. The method of claim 1 further comprising,
a first carrier frequency of the first pulse width modulation signal and
a second carrier frequency of the first pulse width modulation signal,
wherein the first carrier frequency and the second carrier frequency are the same, or an integer multiply of one of the other.

9. The method of claim 1 further comprising,
a first carrier frequency of the first pulse width modulation signal and
a second carrier frequency of the first pulse width modulation signal,
wherein the first carrier frequency and the second carrier frequency are different and a non integer multiply of one of the other.

10. The method of claim 1, wherein the power converter system is a wind turbine.

11. A power converter system with optimized current flow in a DC link busbar, wherein the power converter system comprises,
a first inverter bridge, connected to the DC link busbar at a first end, the first inverter bridge arranged with a first pulse width modulation signal;
a second inverter bridge, connected to the DC link busbar at a second end, the second inverter bridge arranged with a second pulse width modulation signal;
a sensor arranged to measure a current flowing in the DC link busbar from the first end to the second end; and
a controller arranged to optimize the current flowing in the DC link busbar by delaying the first pulse width modulation signal and the second pulse width modulation signal from each other with a carrier delay, wherein the controller is further arranged to optimize the current flow by:
minimizing power losses in the DC link busbar by deriving a model of a frequency dependent impedance of one or more conductors of the DC link busbar;
deriving at least one harmonic of the current flowing in the one or more conductors of the DC link busbar; and
calculating power losses in the DC link busbar based on the at least one harmonic and the model of the frequency dependent impedance of the one or more conductors of the DC link busbar.

12. A wind turbine, comprising:
a tower;
a nacelle disposed on the tower;
a rotor extending from the nacelle and having a plurality of blades disposed on a distal end thereof;
a power converter with optimized current flow in a DC link busbar, wherein the power converter comprises:
a first inverter bridge, connected to the DC link busbar at a first end, the first inverter bridge arranged with a first pulse width modulation signal;
a second inverter bridge, connected to the DC link busbar at a second end, the second inverter bridge arranged with a second pulse width modulation signal;
a sensor arranged to measure a current flowing in the DC link busbar from the first end to the second end; and
a controller arranged to optimize the current flowing in the DC link busbar by delaying the first pulse width modulation signal and the second pulse width modulation signal from each other with a carrier delay, wherein the controller is further arranged to optimize current flow by:
minimizing power losses in the DC link busbar by deriving a model of a frequency dependent impedance of one or more conductors of the DC link busbar;
deriving at least one harmonic of the current flowing in the one or more conductors of the DC link busbar; and
calculating power losses in the DC link busbar based on the at least one harmonic and the model of the frequency dependent impedance of the one or more conductors of the DC link busbar.

* * * * *